US008886915B2

(12) United States Patent
Kwon

(10) Patent No.: US 8,886,915 B2
(45) Date of Patent: Nov. 11, 2014

(54) MULTIPROCESSOR SYSTEM HAVING DIRECT TRANSFER FUNCTION FOR PROGRAM STATUS INFORMATION IN MULTILINK ARCHITECTURE

(75) Inventor: Jin-Hyoung Kwon, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1238 days.

(21) Appl. No.: 12/368,770

(22) Filed: Feb. 10, 2009

(65) Prior Publication Data

US 2009/0249030 A1 Oct. 1, 2009

(30) Foreign Application Priority Data

Mar. 27, 2008 (KR) ........................ 10-2008-0028424

(51) Int. Cl.
 G06F 9/30 (2006.01)
 G06F 15/167 (2006.01)
 G06F 15/80 (2006.01)

(52) U.S. Cl.
 CPC .......... *G06F 15/167* (2013.01); *G06F 15/8038* (2013.01)
 USPC .............................. 712/14; 711/147; 711/154

(58) Field of Classification Search
 None
 See application file for complete search history.

(56) References Cited

U.S. PATENT DOCUMENTS

| | | | | |
|---|---|---|---|---|
| 4,636,942 | A * | 1/1987 | Chen et al. ..................... | 710/269 |
| 5,713,041 | A * | 1/1998 | Chen et al. ..................... | 712/42 |
| 6,025,923 | A * | 2/2000 | Kageyama et al. .......... | 358/1.14 |
| 6,219,761 | B1 * | 4/2001 | Movall et al. ................. | 711/141 |
| 7,805,596 | B2 * | 9/2010 | Noda et al. .................... | 712/244 |
| 2008/0077937 | A1 * | 3/2008 | Shin et al. ..................... | 719/312 |
| 2008/0170460 | A1 * | 7/2008 | Oh et al. .................. | 365/230.05 |
| 2008/0256305 | A1 * | 10/2008 | Kwon et al. .................. | 711/147 |

FOREIGN PATENT DOCUMENTS

| | | |
|---|---|---|
| JP | H06-348314 | 12/1994 |
| JP | 2004-70642 | 3/2004 |
| JP | 2006-277133 | 10/2006 |

OTHER PUBLICATIONS

Kyungwoo Nam et al.; "A 512 mb 2-channel mobile DRAM (oneDRAM™) with shared memory array," Solid-State Circuits Conference, 2007. ASSCC '07. IEEE Asian, vol., No., pp. 204-207, Nov. 12-14, 2007.*
English Abstract for Publication No. H06-348314.
English Abstract for Publication No. 2004-70642.
English Abstract for Publication No. 2006-277133.

* cited by examiner

*Primary Examiner* — William B Partridge
(74) *Attorney, Agent, or Firm* — F. Chau & Associates, LLC

(57) ABSTRACT

A multiprocessor system can directly transmit storage-state information in a multilink architecture. The multiprocessor system includes a first processor; a multiport semiconductor memory device coupled to the first processor; a nonvolatile semiconductor memory device; and a second processor coupled with the multiport semiconductor memory device and the nonvolatile semiconductor memory device in a multilink architecture, storing data, having been written in a shared memory area of the multiport semiconductor memory device by the first processor, in the nonvolatile semiconductor memory device, and directly transmitting storage-state information on whether the storing of the data in the nonvolatile semiconductor memory device has been completed, in response to a request of the first processor, without passing it through the multiport semiconductor memory device. Accordingly a processor indirectly coupled to a nonvolatile memory can directly check a program completion state for write data and thus enhancing a data storage performance of the system.

11 Claims, 17 Drawing Sheets

MULTIPROCESSOR SYSTEM HAVING DIRECT TRANSFER FUNCTION FOR PROGRAM STATUS INFORMATION IN MULTILINK ARCHITECTURE

CROSS-REFERENCE TO RELATED APPLICATIONS

This application claims priority under 35 U.S.C. §119 from Korean Patent Application 10-2008-0028424, filed on Mar. 27, 2008, the contents of which are herein incorporated by reference in their entirety.

BACKGROUND (a) Field of the Invention

The present disclosure is directed to electronic processing systems, and more particularly, to a multiprocessor system having a direct transfer function for program status information in a multilink architecture.

(b) Discussion of the Related Art

Recently developed mobile communication systems, such as, multimedia electronic instruments such as a portable multimedia player (PMP) or handheld phone (HHP), or a personal data assistant (PDA) etc., employ plural processors within one system to obtain increased speed and smoother operation. For example, in handheld phones, in addition to the basic telephone function, other functionality, such as music, games, camera, payment, moving pictures, etc. may be realized according to users' preferences. Such devices therefore need to employ both a communication processor with a communication modulation/demodulation function and an application processor with an application function, except that the communication function is incorporated in a printed circuit board (PCB) within the handheld phone.

In such multiprocessor system, a semiconductor memory such as a dynamic random-access memory (DRAM) etc. employed to store processing data may be altered in view of operation or function. For example, it may be required to simultaneously input/output data through a plurality of respective access ports by employing the plurality of access ports.

In general, a semiconductor memory device having two access ports is called a dual-port memory. A typical dual-port memory used as an image processing video memory has a random access memory (RAM) port accessible in a random sequence and a serial access memory (SAM) port accessible only in a serial sequence. On the other hand, a dynamic random access memory which does not employ an SAM port and for which a shared memory area of a memory cell array constructed of DRAM cells is accessible by respective processors through a plurality of access ports, is called herein a multiport semiconductor memory device or multipath accessible semiconductor memory device to be distinguished from the dual-port memory.

An exemplary multiprocessor system having a shared memory area accessible by a plurality of processors, disclosed in U.S. Publication No. 2003/0093628, by P. Matter et al. and published on May 15, 2003, is shown in FIG. 1.

Referring to FIG. 1 illustrating a block diagram of multiprocessor system 50, a memory array 35 is comprised of first, second and third portions. A first portion 33 of the memory array 35 is accessed only by a first processor 70 through a port 37, a second portion 31 is accessed only by a second processor 80 through a port 38, and a third portion 32 is accessed by both the first and second processors 70 and 80. Here, the size of the first and second portions 33 and 31 of the memory array 35 may vary depending upon an operation load of the first and second processors 70 and 80, and the memory array 35 may be implemented as either a memory type or disk storage type.

Realizing third portion 32 shared by the first and second processors 70 and 80 within memory array 35 in a DRAM involves addressing several issues. Exemplary issues include a layout of memory areas within the memory array 35 and an adequate read/write path control technique for respective ports.

An alternative multiprocessor system including a multimedia system may employ a structure such as that shown in FIG. 2.

FIG. 2 is a block diagram illustrating a memory connection structure of a typical multiprocessor system in a multimedia communication system. The system structure of FIG. 2 comprises two processors 10 and 20, one DRAM 30 and two flash memories 40 and 50.

In detail, a multiprocessor system adaptable to a mobile communication device such as a handheld phone comprises a multiport semiconductor memory device 30 (ONE-DRAM®). First and second processors 10 and 20 employed in the multiprocessor system share the multiport DRAM 30. Thus the multiport semiconductor memory device 30 is individually coupled with the first and second processors 10 and 20 through system buses B1 and B2 and is accessed by all of the first and second processors 10 and 20. On the other hand, a first flash memory 40 is coupled to the first processor 10 through a system bus B4, and a second flash memory 50 is coupled to the second processor 20 through a system bus B3, thus each flash memory is accessed dedicatedly by each corresponding processor.

The structure of a multiprocessor system such as that shown in FIG. 2 does not allow a shared use of flash memory, and realizing such a system leads to increased costs and increased parts occupation area. Accordingly, a multilink architecture (MLA) package as shown in FIG. 3 is disclosed.

However, in the system of FIG. 3, a processor with an indirect connection may not recognize a program completion state of the flash memory.

SUMMARY

Exemplary embodiments of the invention provide an enhanced multiprocessor system capable of rapidly checking storage-state information indicating a program completion state in a nonvolatile semiconductor memory based on a multilink architecture. A multiprocessor system according to an embodiment of the invention can directly transmit storage-state information in the multilink architecture.

According to an embodiment of the invention, a multiprocessor system comprises a first processor; a multiport semiconductor memory device coupled to the first processor; a nonvolatile semiconductor memory device; and a second processor coupled with the multiport semiconductor memory device and the nonvolatile semiconductor memory device in a multilink architecture, storing data, having been written in a shared memory area of the multiport semiconductor memory device by the first processor, in the nonvolatile memory device, and directly transmitting storage-state information on whether the storing of the data in the nonvolatile semiconductor memory device has been completed, in response to a request of the first processor, without passing it through the multiport semiconductor memory device.

The transmission of the storage-state information may be performed through an interrupt scheme or a polling scheme using a serial interface.

The storage-state information may be state information for whether or not the data initially written to the shared memory area of the multiport semiconductor memory device by the first processor has been stored in the nonvolatile semiconductor memory device through the second processor. The second processor may be comprised of an application specific integrated circuit (ASIC).

The multiport semiconductor memory device may comprise port units individually coupled corresponding to the first and second processors; a shared memory area accessed in common by the first and second processors through the port units and assigned in a unit of predetermined memory capacity of a memory cell array; and a data path control unit controlling a data path between the shared memory area and the poll units to perform a data transmission/reception between the first and second processors through the shared memory area.

The memory cell array may further comprise dedicated memory areas accessed by the respective first and second processors. The data path control unit may comprise an internal register positioned outside the memory cell array and accessed by all the processors.

The internal register may be comprised of a latch type register accessed in place of a specific area of the shared memory area when a specific address to access the specific area of the shared memory area is applied, the latch type register storing data used for controlling the data path.

The internal register may comprise a semaphore area storing a control authority for the shared memory area, and mailbox areas individually assigned corresponding to the number of processors to store a message for each processor corresponding to a data transmission direction.

The unit of predetermined memory capacity may be a unit of memory bank, and the nonvolatile semiconductor memory device may be a NAND or NOR type flash memory.

According to another embodiment of the invention, a multiprocessor system comprises a second processor providing a multilink architecture; a multiport semiconductor memory device coupled to the second processor; a nonvolatile semiconductor memory device coupled to the second processor; and a first processor adapted to directly receive storage-state information of the nonvolatile semiconductor memory device from the second processor and to check whether a storage of data has been completed, when writing data to a shared memory area of the multiport semiconductor memory device to store the data at the nonvolatile semiconductor memory device.

According to another embodiment of the invention, a multiprocessor system comprises a first processor performing a task related to communication modulation/demodulation; a multiport semiconductor memory device coupled to the first processor through a first port unit, the multipart semiconductor memory device including a shared memory area assigned in a unit of predetermined memory capacity of a memory cell array and an internal register positioned outside the memory cell array and coupled to an interrupt pin of the first processor; a nonvolatile semiconductor memory device having a page program operation; and a second processor coupled with the multiport semiconductor memory device and the nonvolatile semiconductor memory device in a multilink architecture, and adapted to store data, having been written in a shared memory area of the multiport semiconductor memory device by the first processor, in the nonvolatile semiconductor memory device and to write storage-state information on whether the storing of the data in the nonvolatile semiconductor memory device has been completed to the internal register of the multiport semiconductor memory device in response to a request of the first processor. The multiprocessor system may be one of vehicle-use mobile phone, PMP, a PlayStation Portable® (PSP), PDA and portable phones. The nonvolatile memory may be a memory of an electrically erasable programmable read-only memory (EEPROM) group, flash memory, or phase-change RAM (PRAM).

In addition, in a multiprocessor system, a processor indirectly coupled to a nonvolatile memory can directly check a program completion state for write data and thus enhance data storage performance. Accordingly, error occurrence is reduced in the data storage and the reliability of the system increases.

DETAILED DESCRIPTION OF THE EMBODIMENTS

Embodiments of the present invention will now be described more fully with reference to the accompanying drawings, in which exemplary embodiments of the invention are shown, however, may be embodied in various different forms, and should not be construed as being limited only to the illustrated embodiments.

Exemplary embodiments of a multiprocessor system capable of directly transmitting storage-state information in a multilink architecture are described below, referring to the accompanying drawings.

Figure 1:
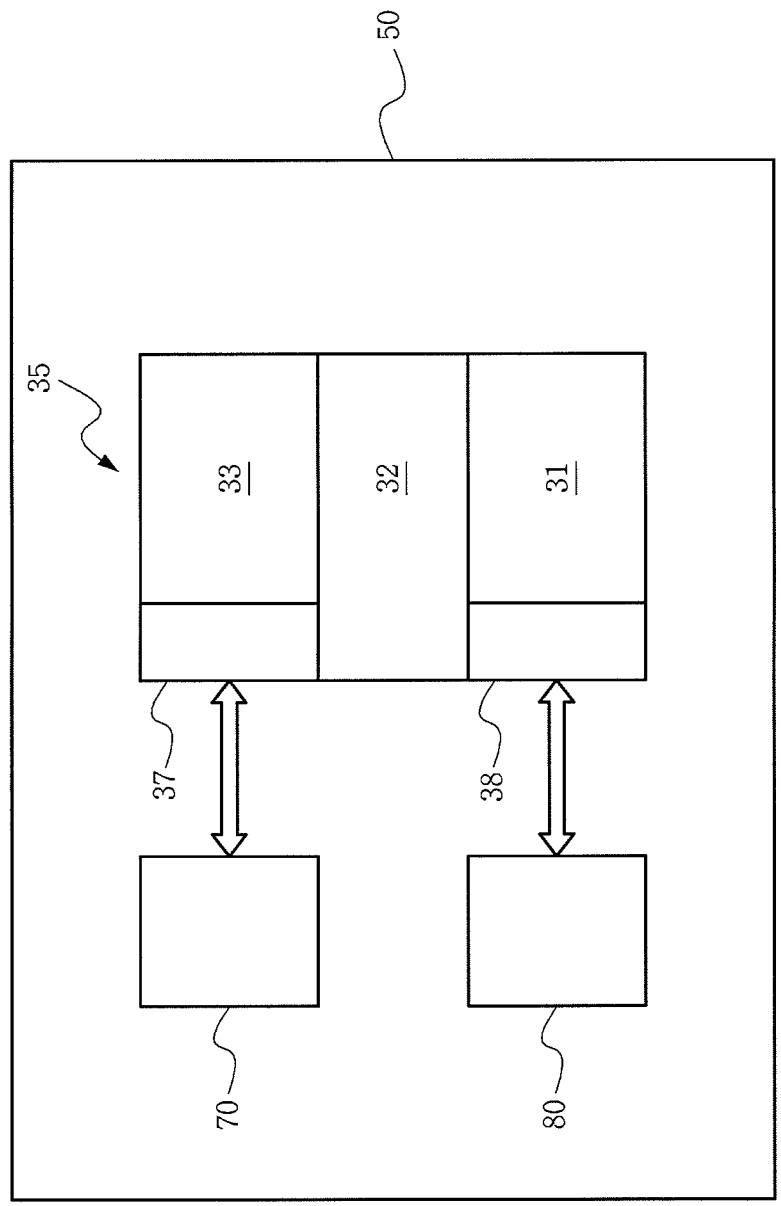
FIG. 1 is a block diagram of multiprocessor system.
Figure 2:
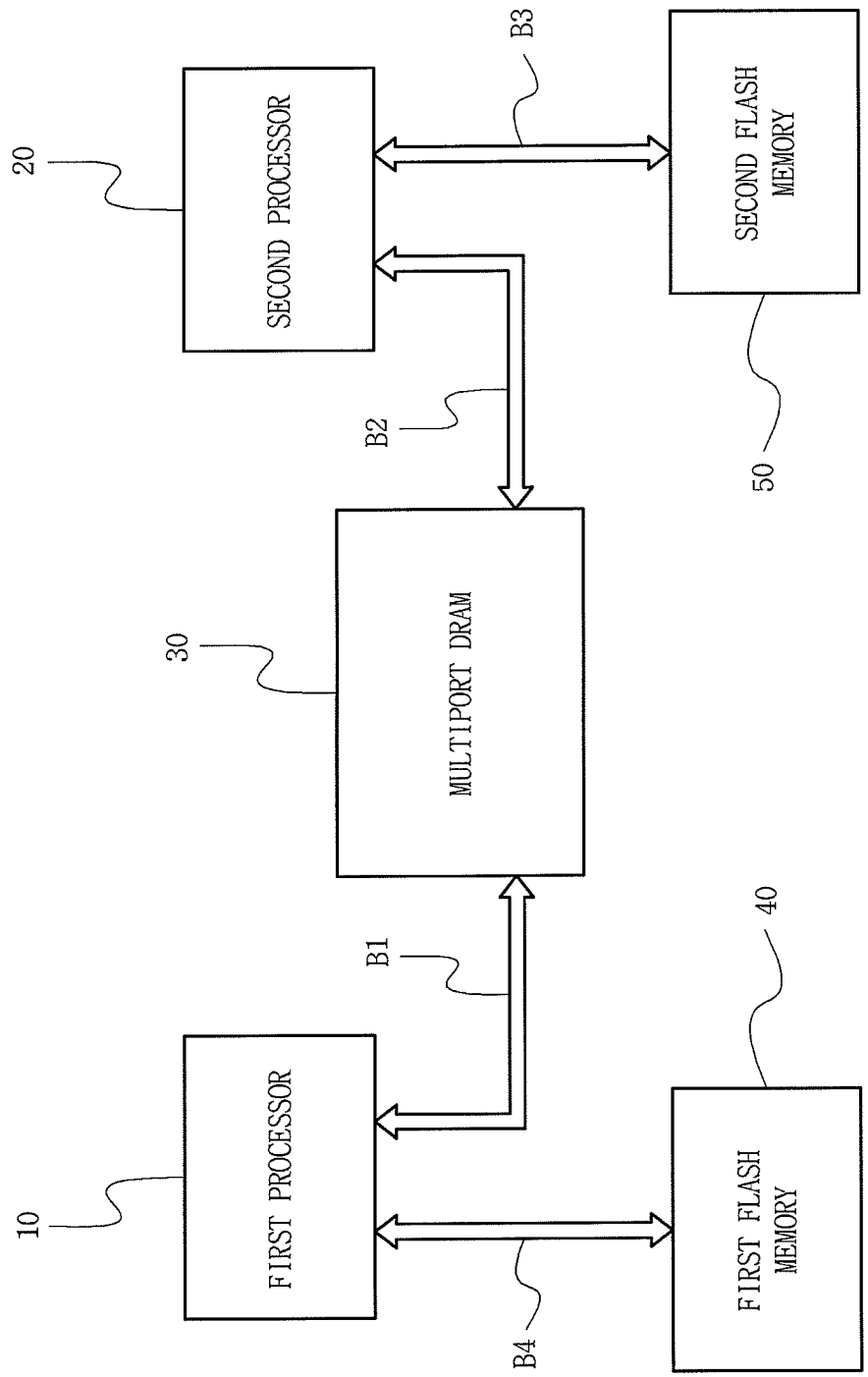
FIG. 2 is a block diagram illustrating a memory connection structure of multiprocessor system in a communication system.
Figure 3:
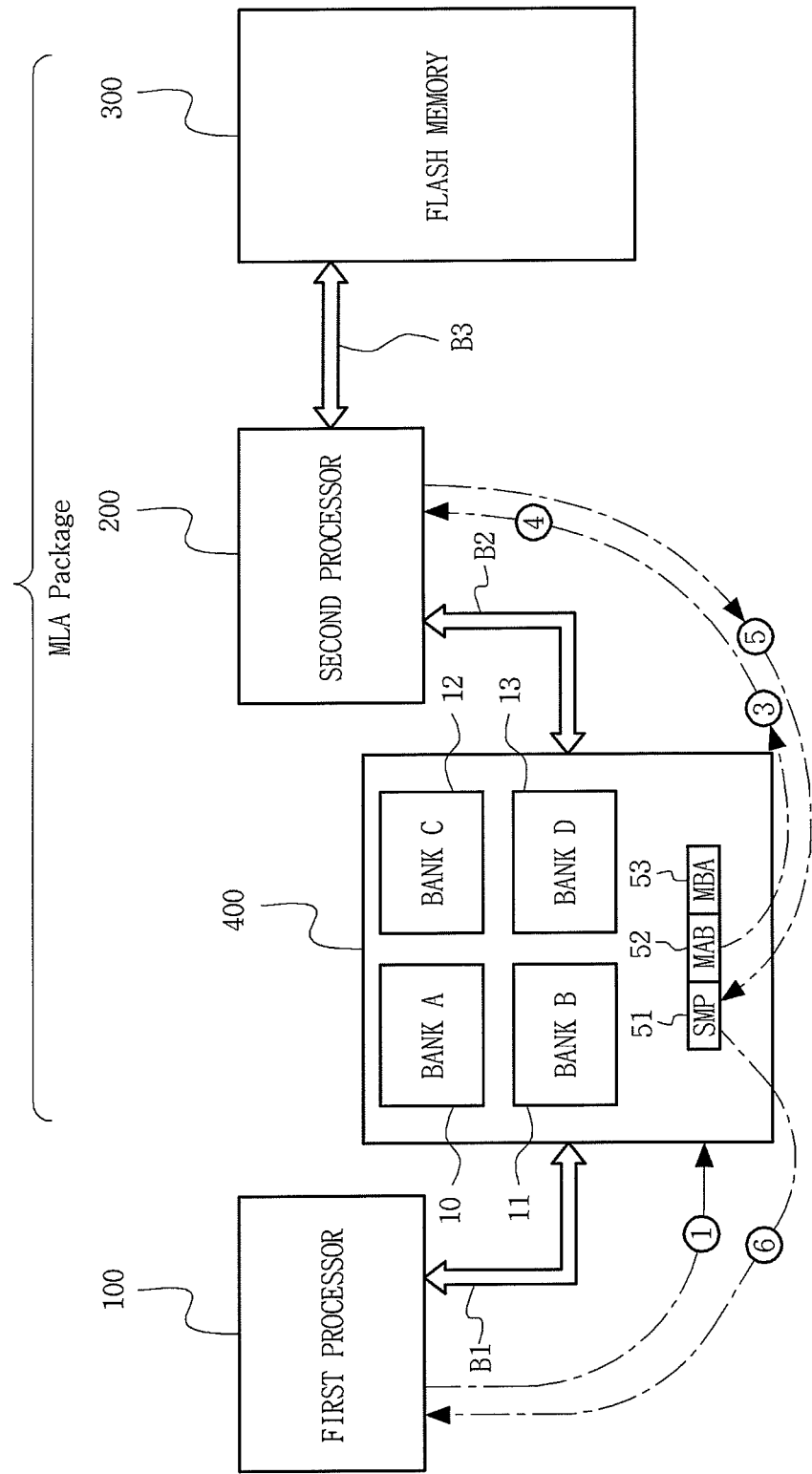
FIG. 3 schematically illustrates a block diagram of multiprocessor system having MLA.
Figure 4:
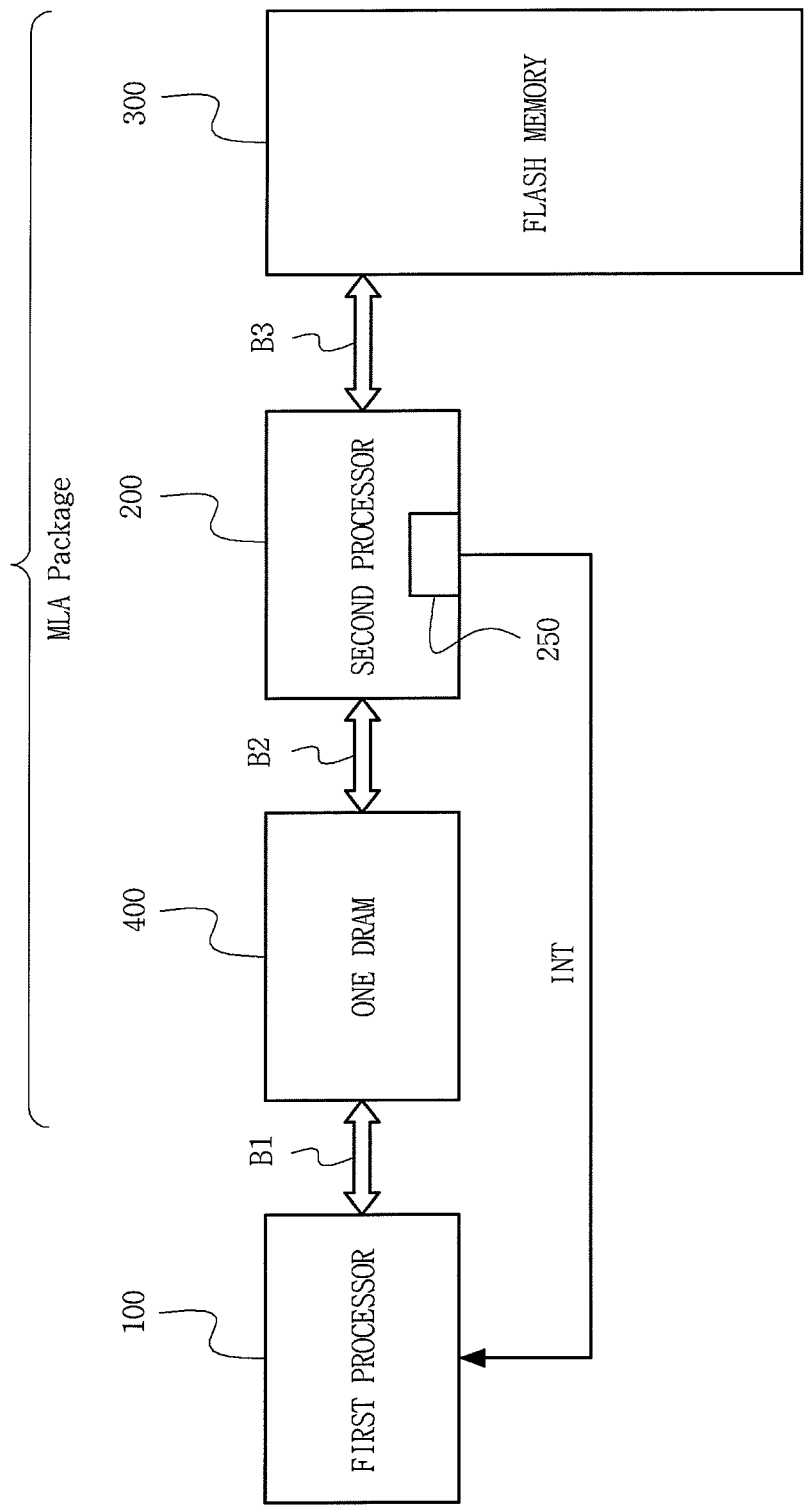
FIG. 4 is a block diagram schematically illustrating a multiprocessor system according to an embodiment of the invention.

A general multiprocessor system of FIG. 3 is described in brief before describing FIG. 4. FIG. 3 schematically illustrates a block diagram of multiprocessor system having a multilink architecture (MLA).

With reference to FIG. 3, there is a wiring structure including two processors 100 and 200 and one DRAM 400, and one flash memory 300. In the structure of FIG. 3, one flash memory 300 is coupled to a second processor 200 through a bus line B3, thus the first processor 100 can indirectly access the flash memory 300 through the DRAM 400 and the second processor 200. On the other hand, the second processor 200 directly accesses the flash memory 300.

Here the first processor 100 may have a modem functionality that performs a predetermined task, i.e., modulation and demodulation of a communication signal, and the second processor 200 may have an application processor functionality that handles user communication data, games, amusement, etc., or vice versa, or the function may be added thereto. The second processor 200 may an application specific integrated circuit (ASIC).

The flash memory 300 may be an NOR flash memory having a NOR structure for a cell array configuration or a NAND flash memory having a NAND structure for a cell array configuration. Both the NOR flash memory and the NAND flash memory are nonvolatile memory in which memory cells constructed of a metal oxide semiconductor (MOS) transistor having a floating gate are formed in an array type. Such nonvolatile memory is adapted to store data that must not be deleted when power is turned off, for example, boot codes of handheld instruments, program, communication data, or preservation data.

In addition, the multiport DRAM 400, referred to herein below 'ONEDRAM®', can function as a main memory for processes of processors 100 and 200. As illustrated in FIG. 3, to access one multiport DRAM 400 through two different access paths by respective first and second processors 100 and 200, the multiport DRAM 400 includes therein memory banks and port units individually coupled corresponding to system buses B1 and B2. Such a configuration of multi ports is different from a general DRAM having a single port.

The multiport DRAM 400 shown in FIG. 3, referred to herein below as "ONEDRAM®", is a fusion memory chip that can increase a data processing speed between a communication processor and a media processor in a mobile device. In general two processors require two memory buffers. But a ONEDRAM® solution according to an embodiment of the invention can route data between processors through a single chip, thus two memory buffers need not be required. A ONEDRAM® can reduce the time for transmitting data between processors by employing a dual-port approach. A single ONEDRAM® module can substitute for at least two mobile memory chips within a high-performance smart-phone and other multimedia rich-handset. As a data processing speed between processors increases, ONEDRAM® can reduce power consumption by about 30 percent and the number of chips, and reduce the total die area coverage by about 50 percent as compared with the existing ones. Thus, the speed of cellular phone can be increased, battery life can be prolonged, and the handset can be made slimmer.

For example, the multiport DRAM 400 of FIG. 3 may have a memory cell array comprised of four memory areas, with a first bank 10 as a memory area dedicatedly accessible by first processor 100, and third and fourth banks 12 and 13 as memory areas dedicatedly accessible by second processor 200. On the other hand, second bank 11 may be accessed by both the first and second processors 100 and 200 through mutually different ports. As a result, in the memory cell array, the second bank 11 is assigned as a shared memory area, and first, third and fourth banks 10, 12 and 13 are assigned as the dedicated memory areas accessed only by each corresponding processor.

When the first processor 100 accesses the second bank 11, a path controller (not shown) of the multiport DRAM 400 ensures that the second bank 11 is coupled to a system bus B1. While the first processor 100 accesses the second bank 11, the second processor 200 can access the third or fourth bank 12 or 13 as the dedicated memory. When the first processor 100 does not access the second bank 11, the second processor 200 can access the second bank 11 as the shared memory area.

In the memory connection structure of FIG. 3, to store modem data of the first processor 100 at the flash memory 300, the first processor 100 first writes modem data to the second bank 11 of the multiport DRAM 400. In a first step (1), a message including program command, size and address of written data, and address of flash memory to store data, is written to a first mailbox 52 of the path controller. The second processor 200 checks the message through a third step (3) and reads the message in a fourth step (4). In this case, to access the second bank 11 by the second processor 200, a control authority flag provided within a semaphore area 51 should be changed to the second processor's (200), and the second processor 200 performs a fifth step (5) of changing the control authority flag of the semaphore area 51 to the second processor's. The first processor 100 checks the control authority flag of the semaphore area 51 through a sixth step (6) and then releases an occupation authority for the second bank 11, and hence the second processor 200 has an access authority to the second bank 11 as the shared memory. The second processor 200 reads data written to the second bank 11 by the first processor, through a system bus B2, and applies the data to a system bus B3. Accordingly, the modem data is stored in a nonvolatile storage area of the flash memory 300.

Thus, the first processor 100 indirectly writes its modem data to the flash memory 300, and thus the first processor 100 needs to be able to check whether or not modem data written to the second bank 11 has been stored in the flash memory 300. To do this, the first processor 100 writes a program completion check message to the mailbox 52, and the second processor 200 receives the program completion check message and writes a response message to a second mailbox 53. Then, the first processor 100 reads the message of the second mailbox 53 to confirm whether the program is completed. For example, when the program is not completed, the first processor 100 repeats the operation of writing a program completion check message to the mailbox 52.

Therefore, in the system structure like FIG. 3, the first processor 100 indirectly performs a write operation to flash memory through the multiport DRAM 400 with a help of the second processor 200, however, it may not be able to quickly check the program completion state of the flash memory.

In order to store data from a first processor to a nonvolatile semiconductor memory device, the data is stored in a shared memory area of a multiport semiconductor memory device and a second processor reads out the data from the shared memory area and stores the data in the nonvolatile semiconductor memory device. The second processor checks whether the storing of the data has been completed, that is, whether a data programming operation has been completed, in response to the first processor's request, and directly transmits the check result as storage-stage information without using the multiport semiconductor memory device. Accordingly, the first processor indirectly coupled to a nonvolatile memory can directly check for write data to determine whether a program operation has completed.

FIG. 4 is a block diagram schematically illustrating a multiprocessor system according to an embodiment of the invention.

Referring to FIG. 4, unlike the connection structure of FIG. 3, an interrupt signal line INT connects first processor 100 and second processor 200 in the MLA. The interrupt signal INT is provided to directly transmit storage-state information. When data, which has been stored in a shared memory area of the ONEDRAM® 400 by the first processor 100, is stored in the flash memory 300, storage-state information on whether the data has been stored at the flash memory 300 can be directly transmitted to the first processor 100 from an interrupt generator 250 of the second processor 200 without passing through the ONEDRAM® 400. Accordingly, the first processor 100 can quickly know the storage-state information and process a subsequent operation.

Figure 5:
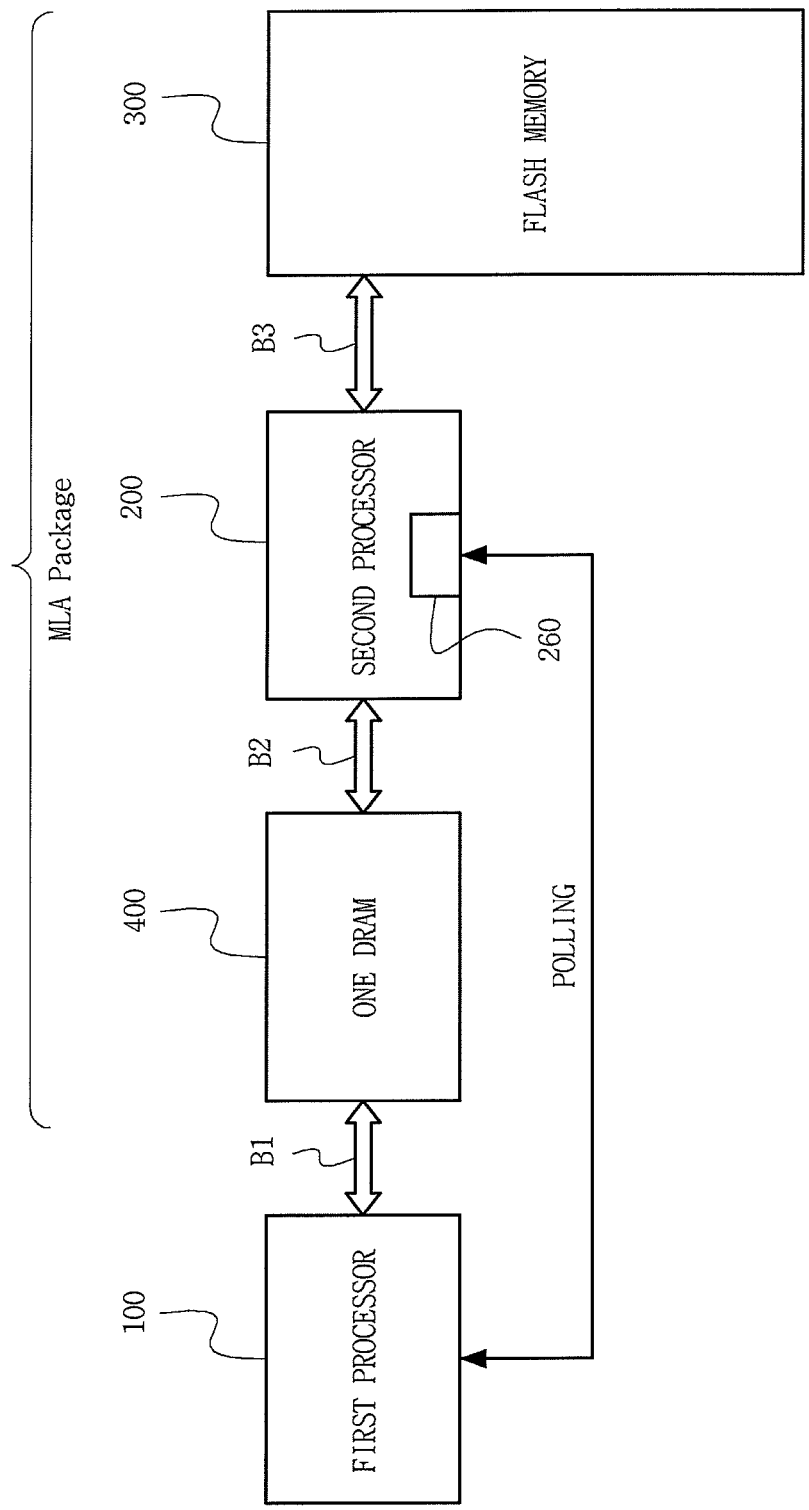
FIG. 5 is a block diagram schematically illustrating a multiprocessor system according to another embodiment of the invention.

FIG. 5 is a block diagram schematically illustrating a multiprocessor system according to another embodiment of the invention.

With reference to FIG. 5, unlike the connection structure of FIG. 3, a polling line connects the first processor 100 and the second processor 200 in the MLA. The polling line can also directly transmit storage-state information. The polling line is provided as an interface line and may also be used as, e.g., an interface line of a universal asynchronous receiver/transmitter (UART) etc.

According to an embodiment of the invention, the first processor 100 may provide a modem functionality, i.e., modulation and demodulation of a communication signal, and the second processor 200 may have an application processor functionality for processing communication data, games, or amusement, etc.

Figure 6:
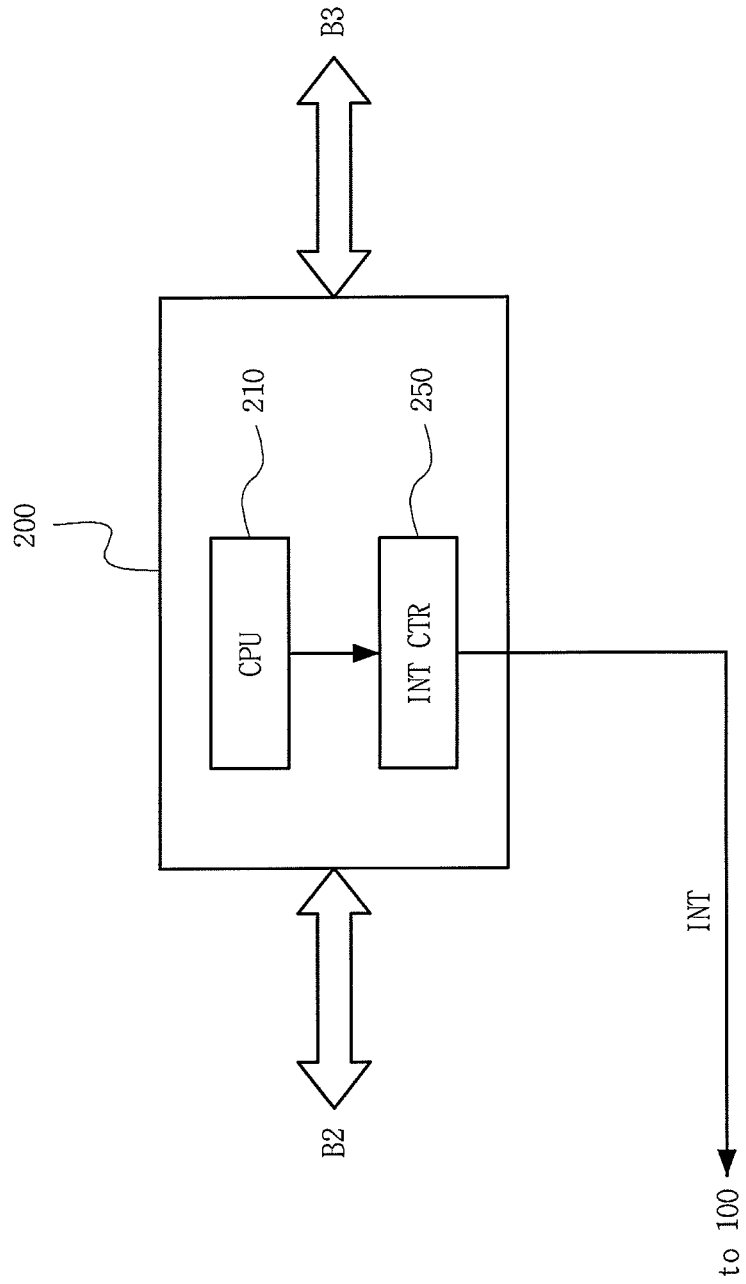
FIG. 6 is a block diagram of a circuit related to a storage-state information output of second processor referred to in FIG. 4.

FIG. 6 is a block diagram of a circuit related to a storage-state information output of second processor referred to in FIG. 4. The second processor 200 includes a central processing unit (CPU) 210 and an interrupt generator 250. When data of the first processor 100 is stored at the flash memory 300, the CPU 210 of the second processor 200 applies to the interrupt generator 250 the program completion-state information for whether the data write operation to the storage area of the flash memory 300 has been completed. The interrupt generator 250 generates storage-state information in response to the data write completion-state information, and directly transmits the information to the first processor 100 without passing through the ONEDRAM® 400. The first processor 100 receives the storage-state information through, e.g., a general-purpose input/output (GPIO) pin, to confirm whether data initially written to shared memory have been completely stored at the flash memory.

Figure 7:
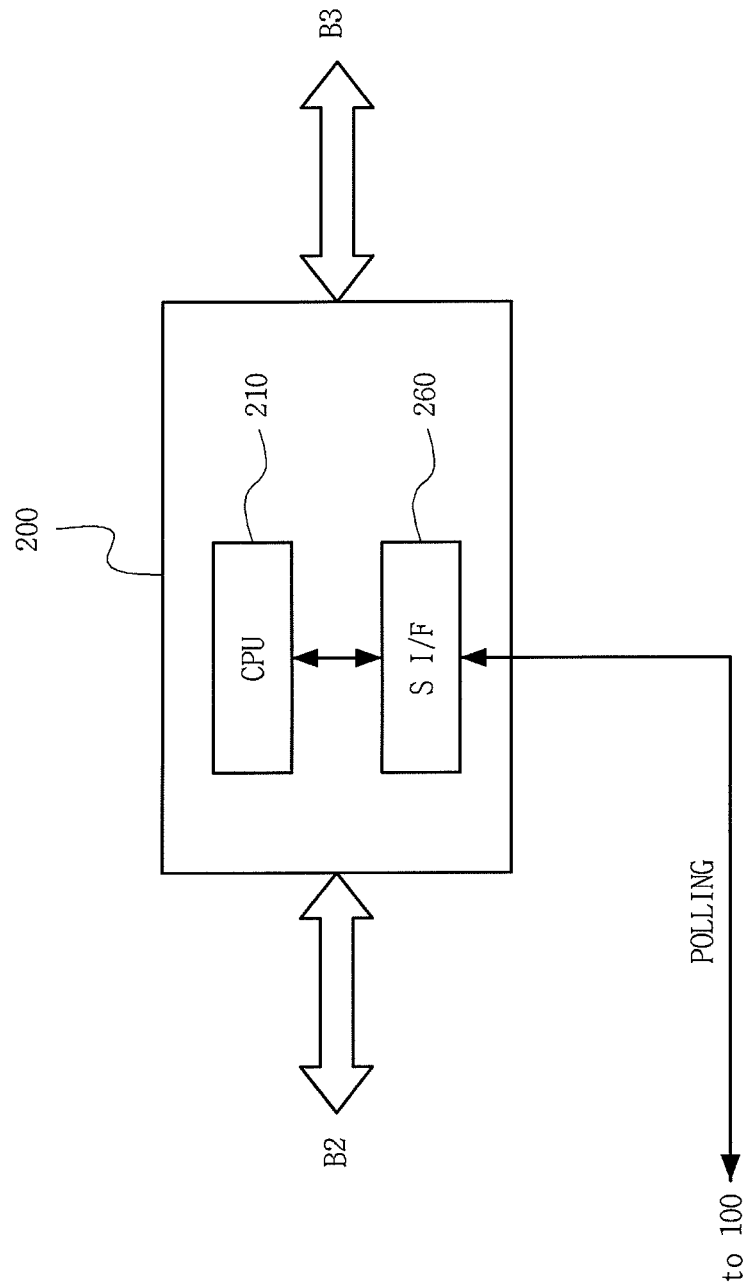
FIG. 7 is a block diagram of a circuit related to an output of storage-state information of second processor referred to in FIG. 5.

FIG. 7 is a block diagram of a circuit related to an output of storage-state information of second processor referred to in FIG. 5. The second processor 200 includes a CPU 210 and a serial interface 260. When the first processor 100 requires the second processor 200 to check whether the storing of data in the flash memory 300 is completed, the CPU 210 of the second processor 200 transmits program completion-state information representing the check result to the serial interface 260. The serial interface 260 generates storage-state information in response to the data storage completion-state information, and directly transmits the information to the first processor 100 without passing through the ONEDRAM® 400. Therefore, the first processor 100 receives the storage-state information through, e.g., the UART, to confirm in a polling scheme whether data written at shared memory has been stored at the flash memory.

Examples of the first and second processors 100 and 200 commonly accessing the ONEDRAM® 400 shown in FIGS. 4 and 5 are described as follows, referring to FIGS. 8 to 11 and FIGS. 13 and 14.

Figure 8:
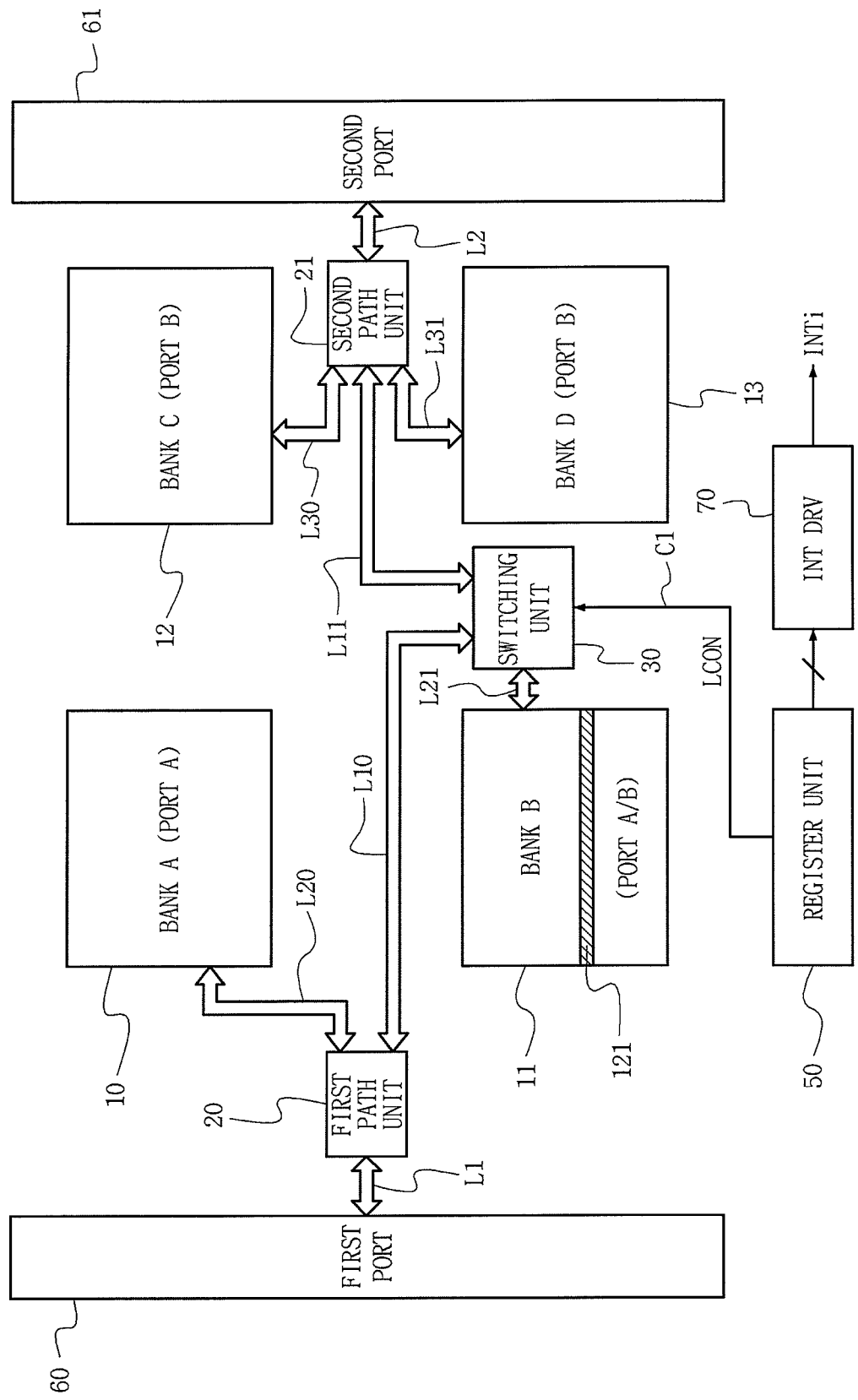
FIG. 8 is a block diagram of a multiport semiconductor memory device shown in FIGS. 4 and 5.

FIG. 8 is a block diagram of a multiport semiconductor memory device shown in FIGS. 4 and 5.

With reference to FIG. 8, four memory banks constituting a memory cell array are disposed in the inside of the multiport semiconductor memory device 400 coupled to respectively corresponding processors 100 and 200 through system buses B1 and B2 of FIG. 4 or 5. Of the four banks, a bank A 10 functioning as a first dedicated memory area may be configured to be accessed dedicatedly by a first processor 100, and banks C and D, 12 and 13, functioning as second dedicated memory areas may be configured to be accessed dedicatedly by a second processor 200.

On the other hand, bank. B 11 as the shared memory area has a connection structure that supports being accessed by both the first and second processors 100 and 200. That is, the bank B 11 within the memory cell array is assigned as the shared memory area.

The dedicated memory areas 10, 12 and 13 and the shared memory area 11 are all comprised of DRAM cells of which each is constructed of one access transistor and one storage capacitor. The DRAM cells need a refresh operation to preserve a storage charge of the cell. Here, the four memory areas 10, 11, 12 and 13 may be individually configured as a bank unit of DRAM, and one bank may have a memory storage of, i.e., 16 Mb (Megabit), 32 Mb, 64 Mb, 128 Mb, 256 Mb, 512 Mb or 1024 Mb.

First and second ports 60 and 61 shown in FIG. 8 constitute the port units. The port units are coupled with respective corresponding processors 100 and 200 through system buses B1 and B2. The shared memory area bank B 11 is accessed in common by the processors 100 and 200 through the port units 60 and 61 and has a predetermined memory capacity unit in a portion of memory cell array.

A register unit 50 functioning as a data path control unit controls a data path between the shared memory area 11 and the port units 60 and 61 to initiate a data transmission/reception between the processors 100 and 200 through the shared memory area 11.

The register unit 50 is substitutively accessed in place of a specific area 121 of the shared memory area 11 when a specific address to access the specific area 121 of the shared memory area 11 is applied, and stores data necessary for a control of the data path and a transfer of a message.

In other words, the register unit 50 is a data storage area adapted separately from the memory cell array area for interfacing between processors, and is accessed by both the first and second processors, and may be comprised of flip-flop, data latch, etc. That is, the register unit 50 is comprised of a latch type storage cell different from a DRAM memory cell, thus does not require a refresh operation.

In FIG. 8, a switching unit 30 is coupled to the register unit 50, and according to a switching control signal LCON applied through a control line C1, the shared memory area 11 is operationally coupled to the first path unit 20 or second path unit 21.

As a result, when the first processor 100 coupled to first port 60 accesses the shared memory area 11, lines L1, L10 and L21, the first path unit 20, switching unit 30 and shared memory area 11 are operationally connected with one another.

Figure 11:
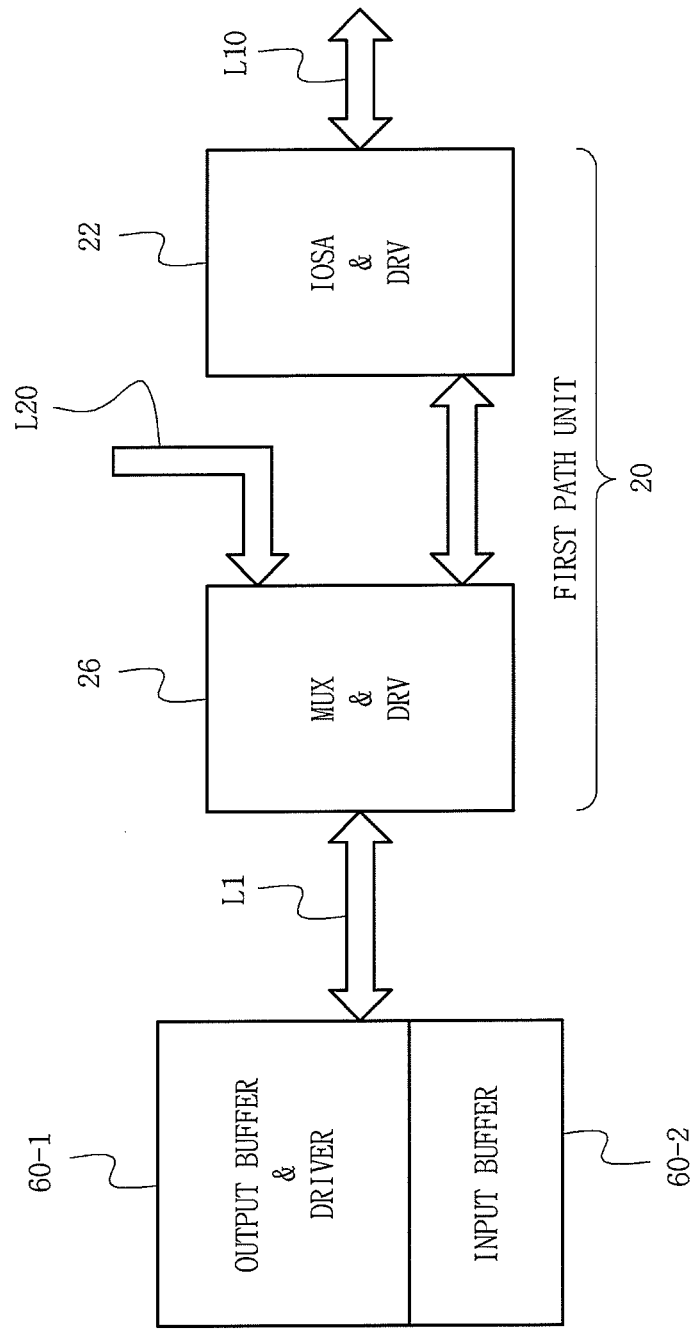
FIG. 11 is a block diagram illustrating in detail an example of connection structure between first port unit and first path unit shown in FIG. 8.

In FIG. 8, the first path unit 20 has a basic function of switching a line L1 to one of input/output lines L10 and L20, and may be comprised of an input/output sense amplifier and driver 22 and a multiplexer and driver 26 as shown in FIG. 11. Similarly, the second path unit 21 has a basic function of switching a line L2 to one of input/output lines L30, L11 and L31, and may be comprised of input/output sense amplifier and driver 22 and multiplexer and driver 26 as shown in FIG. 11. In addition, an interrupt driver 70 is coupled to the register unit 50 and may apply a processor interrupt signal INTi to be applied to each processor.

Figure 9:
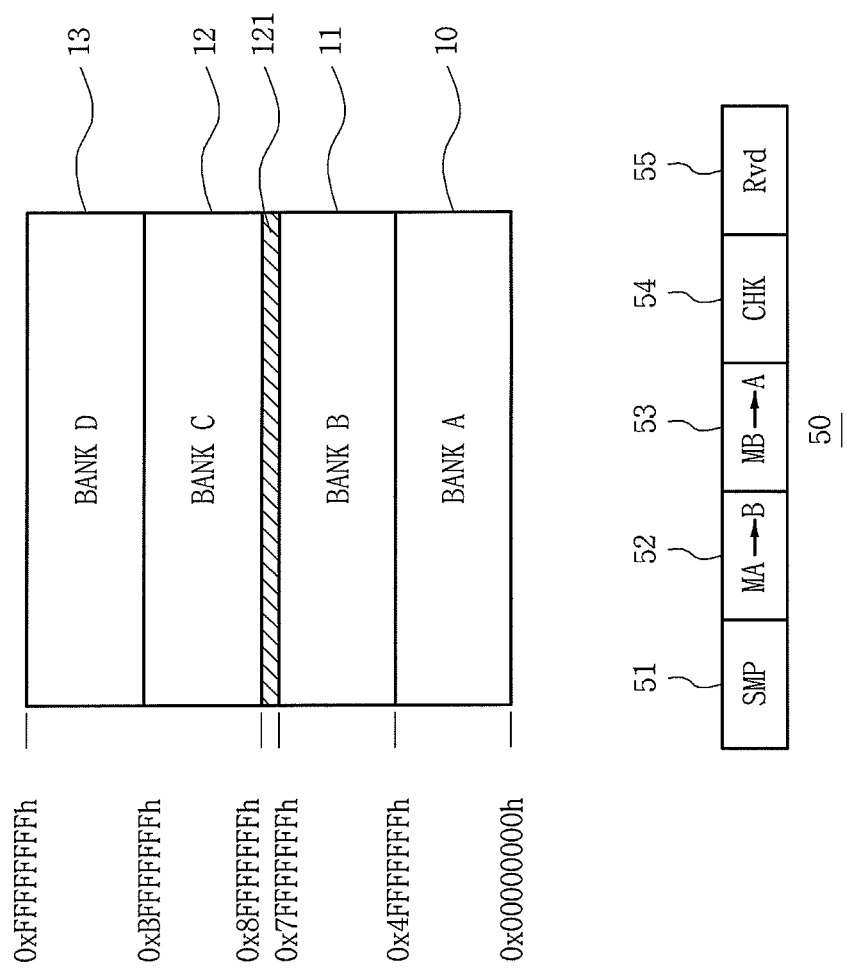
FIG. 9 illustrates an address assignment of memory banks and internal register shown in FIG. 8 and a substitutive access relation therebetween.

FIG. 9 illustrates an address assignment for the memory banks and internal register shown in FIG. 8 and a substitutive access relation therebetween.

In FIG. 9, in an assumption that respective banks 10-13 have a capacity of 16 megabits, a specific area of the shared memory area bank B, 11 is selected as a disable area 121. That is, a specific row address (0x7FFFFFFFh~0x8FFFFFFFh, 2 KB size=1 row size) of the shared memory area 11 comprised of DRAM cells is changeably assigned to the register unit 50 functioning as an interface unit. Then, when the specific row address (0x7FFFFFFFh~0x8FFFFFFFh) is applied, a corresponding specific word line 121 of the shared memory area 11 is disabled, but the register unit 50 is enabled. As a result, in an embodiment of the invention, semaphore area 51 and mailbox areas 52 and 53 are accessed by using a direct address mapping method, and an internal command corresponding to the disabled address is decoded, thus mapping to a register arranged outside the memory cell array. Thus, a memory controller of a chip set can produce a command for this area in the same method as other memory cells.

In FIG. 9, access authority information for the shared memory area 11 is stored in the semaphore areas 51. In first and second mailbox areas 52 and 53, messages transmitted to mutual corresponding processors from the first and second processors 100 and 200, i.e., authority request, address, data size, transmission data indicating an address of shared memory having storage data, or commands, etc., are written. That is, in the first mailbox area 52, a message transmitted from the first processor 100 to the second processor 200 is written, and in the second mailbox area 53, a message transmitted from the second processor 200 to the first processor 100 is written.

The semaphore area 51, the first mailbox area 52 (mail box A to B) and the second mailbox area 53 (mail box B to A) may be each assigned with 16 bits, and a check bit area 54 may be assigned with 4 bits. Area 55 not described above may be assigned with 2 bits as a reserve area.

The areas 51, 52, 53, 54 and 55 can be enabled in common by the specific row address, and are separately accessed by an applied column address.

For example, when a data interface between the first and second processors 100 and 200 is created through multiport DRAM 400, the first and second processors 100 and 200 can write a message to the corresponding processor by using the mailboxes 52 and 53. A processor of receiving party having read the written message recognizes the message of the transmission-party processor and performs its corresponding operation. As described above, when the processors perform the data communication by utilizing the mailboxes 52 and 53, a host interface is removed or substantially reduced, a system structure becomes more compact, and the system operation can be enhanced.

Figure 10:
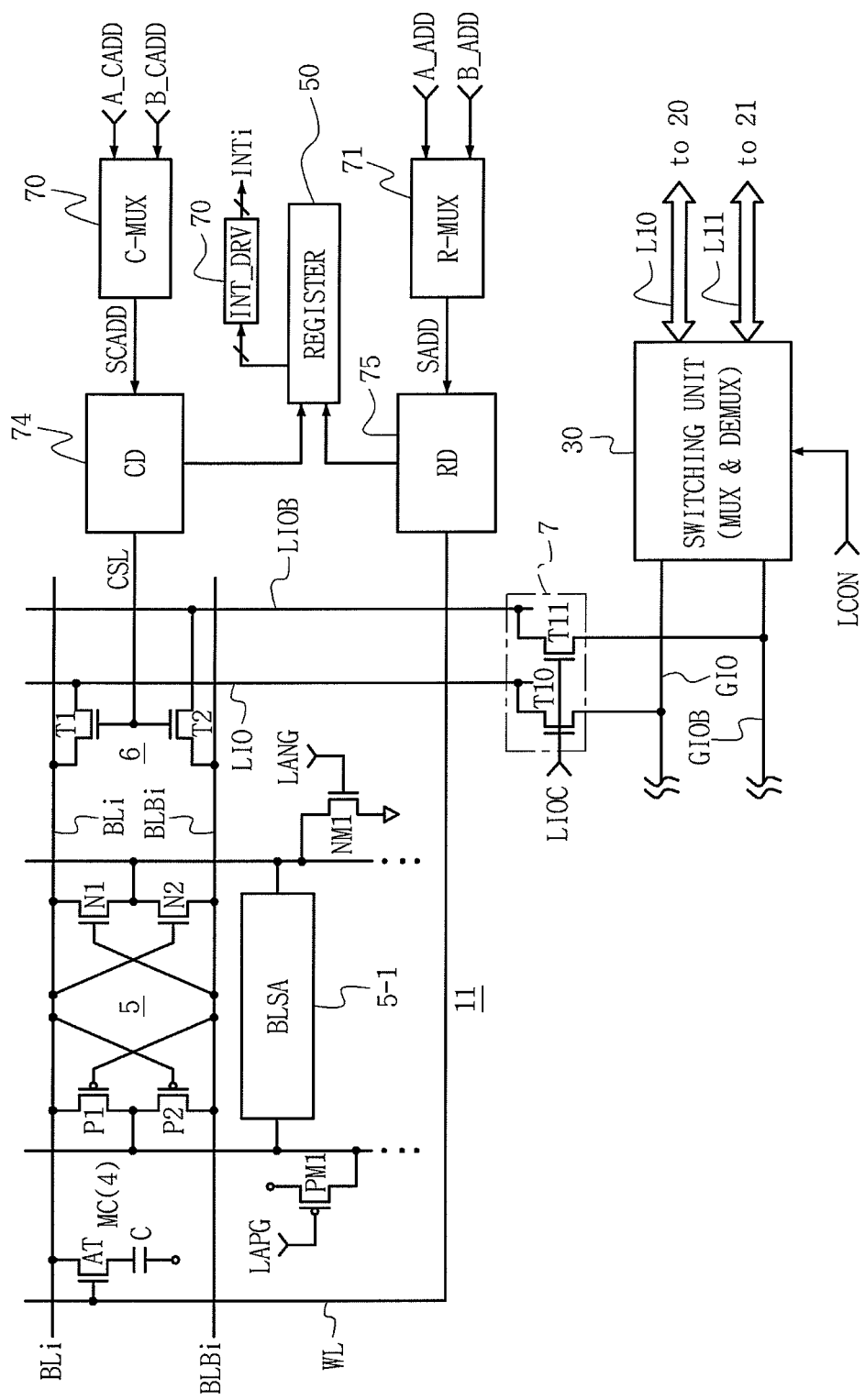
FIG. 10 illustrates in detail an example of multipath access to a shared memory area shown in FIG. 8.

FIG. 10 illustrates in detail an example of multipath access to shared memory area shown in FIG. 8. FIG. 11 is a block diagram illustrating in detail an example of connection structure between first port unit and first path unit shown in FIG. 8, in the configuration with first port unit 60 comprised of an output buffer and driver 60-1 and an input buffer 60-2, and first path unit 20 comprised of an input/output sense amplifier and driver 22 and a multiplexer and driver 26.

With reference to FIG. 10, a memory cell 4 (MC(4)) indicates a memory cell belonging to the shared memory area 11 of FIG. 8. Referring to the drawings, the shared memory area 11 is operationally coupled to one of first and second path units 20 and 21 referred to in FIG. 8 through a switching operation of switching unit 30.

Within the shared memory area 11, the DRAM cell 4 comprised of one access transistor AT and a storage capacitor C constitutes a unit memory device. The DRAM cell 4 is connected individually with intersections of pluralities of word lines and bit lines, thus constituting a matrix type bank array. A word line WL shown in FIG. 10 is disposed between a gate of access transistor AT of the DRAM cell 4 and a row decoder 75. The row decoder 75 applies a row decoded signal to the word line and the register unit 50 in response to a selection row address SADD of row address multiplexer 71. A bit line BLi constituting a bit line pair is coupled to a drain of the access transistor AT and a column selection transistor T1. A complementary bit line BLBi is coupled to a column selection transistor T2. P-type metal-oxide-semiconductor (PMOS) transistors P1 and P2 and N-type metal-oxide-semiconductor (NMOS) transistors N1 and N2 coupled to the bit line pair BLi, BLBi constitute a bit line sense amplifier 5. Sense amplifier driving transistors PM1 and NM1 each receive a drive signal LAPG, LANG, and drive the bit line sense amplifier 5. A column selection gate 6 comprised of column selection transistors T1 and T2 is coupled to a column selection line CSL transferring a column decoded signal of a column decoder 74. The column decoder 74 applies a column decoded-signal to the column selection line and the register unit 50 in response to a selection column address SCADD of column address multiplexer 70.

In FIG. 10, a local input/output line pair LEO, LIOB is coupled to a first multiplexer 7. When transistors T10 and T11 constituting the first multiplexer 7 are turned on in response to a local input/output line control signal LIOC, the local input/output line pair LIO, LIOB is coupled to a global input/output line pair G10, GIOB. Then, data of the local input/output line pair LIO, LIOB is transferred to the global input/output line pair GIO, GIOB in a data read mode. On the other hand, in a data write mode, write data applied to the global input/output line pair GIO, GIOB is transferred to the local input/output line pair LIO, LIOB. The local input/output line control signal LIOC may be a signal generated in response to a decoded signal output from the row decoder 75.

Read data transferred to the global input/output line pair GIO, GIOB is transferred to a corresponding input/output sense amplifier and driver 22 through one of lines L10 and L11 as shown in FIG. 11. The input/output sense amplifier 22 again amplifies data whose level has been weakened according to the transfer steps through several data paths. Read data output from the input/output sense amplifier 22 is transferred to output buffer 60-1 of the first port 60 through multiplexer and driver 26 that constitutes a first path unit 20 together with the input/output sense amplifier 22 as shown in FIG. 11. When the shared memory area 11 is in a state of being accessed by the first processor 100, the second processor 200 is disconnected from the line L11, thus an access operation of the second processor 200 to the shared memory area 11 is intercepted. But, in this case, the second processor 200 can access the dedicated memory areas 12 and 13 through second port 61.

In a write operation, write data applied through the first port 60 is transferred to the global input/output line pair GIO, GIOB of FIG. 10 sequentially through an input buffer 60-2, multiplexer and driver 26, input/output sense amplifier and driver 22 and the switching unit 30 of FIG. 11. When the first multiplexer 7 is activated, the write data is transferred to local input/output line pair LIO, LIOB and is stored in a selected memory cell 4.

An output buffer and driver 60-1 and input buffer 60-2 shown in FIG. 11 may correspond to or be included in the first port 60 of FIG. 8. Further, input/output sense amplifier and driver 22 and multiplexer and driver 26 are may correspond to or be included in first path unit 20 of FIG. 8. The multiplexer and driver 26 additionally prevents one processor from simultaneously accessing the shared memory area 11 and dedicated memory area 10.

As described above, in a multiport semiconductor memory device 400 having the detailed configuration as shown in FIG. 10, a DRAM interface function can be provided between processors 100 and 200 since two processors can access in common the shared memory area 11. Furthermore, the processors 100 and 200 can perform a data communication through the commonly accessible shared memory area by transmitting and receiving messages through the register unit 50 functioning as an interface unit.

Figure 12:
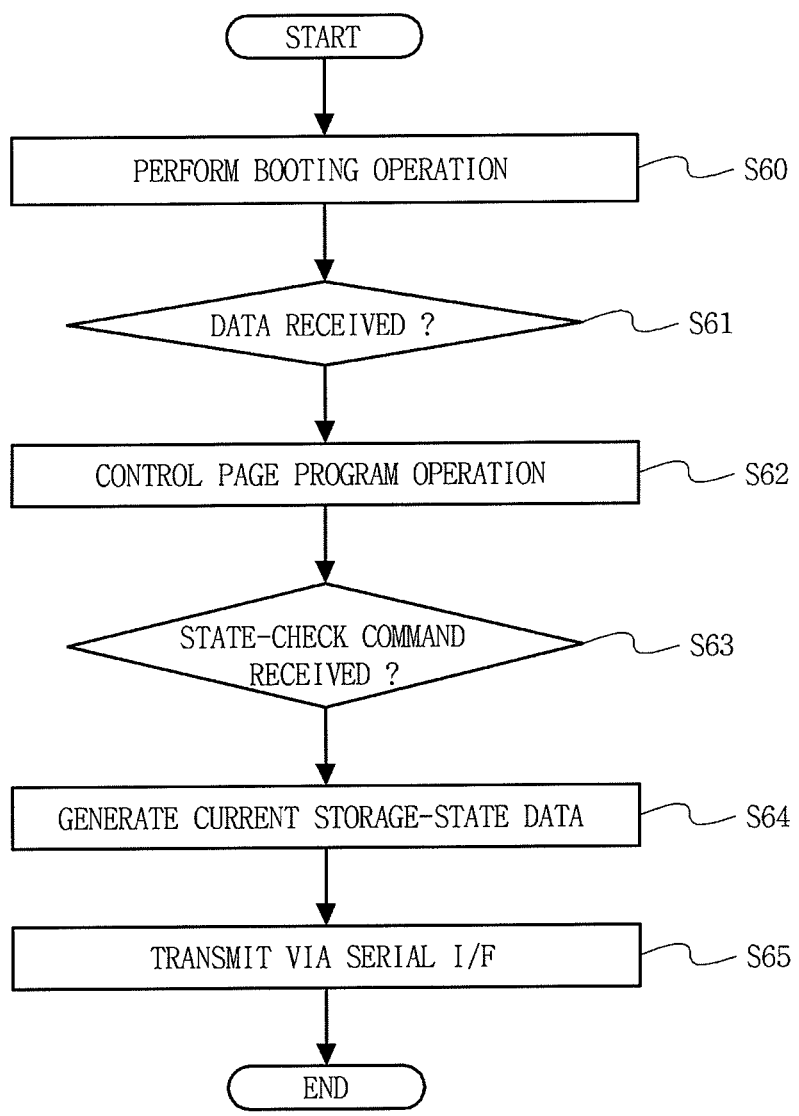
FIG. 12 is a flowchart providing a control operation related to a generation of storage-state information of second processor according to an embodiment of the invention.

FIG. 12 is a flowchart of a control operation method for generating storage-state information of a second processor, according to an embodiment of the invention.

Referring to the drawing, when a booting operation of step S60 is performed and then a data receipt of a step S61 is checked, the second processor 200 performs a step S62 to control a page program operation. In this case, the second processor 200 reads out data written by the first processor 100 to the shared memory area 11, and stores the data to the flash memory 300. The flash memory 300 stores the data of the first processor 100 at page unit of data storage area under control of the second processor. The storage operation of the flash memory will be described below.

Figure 13:
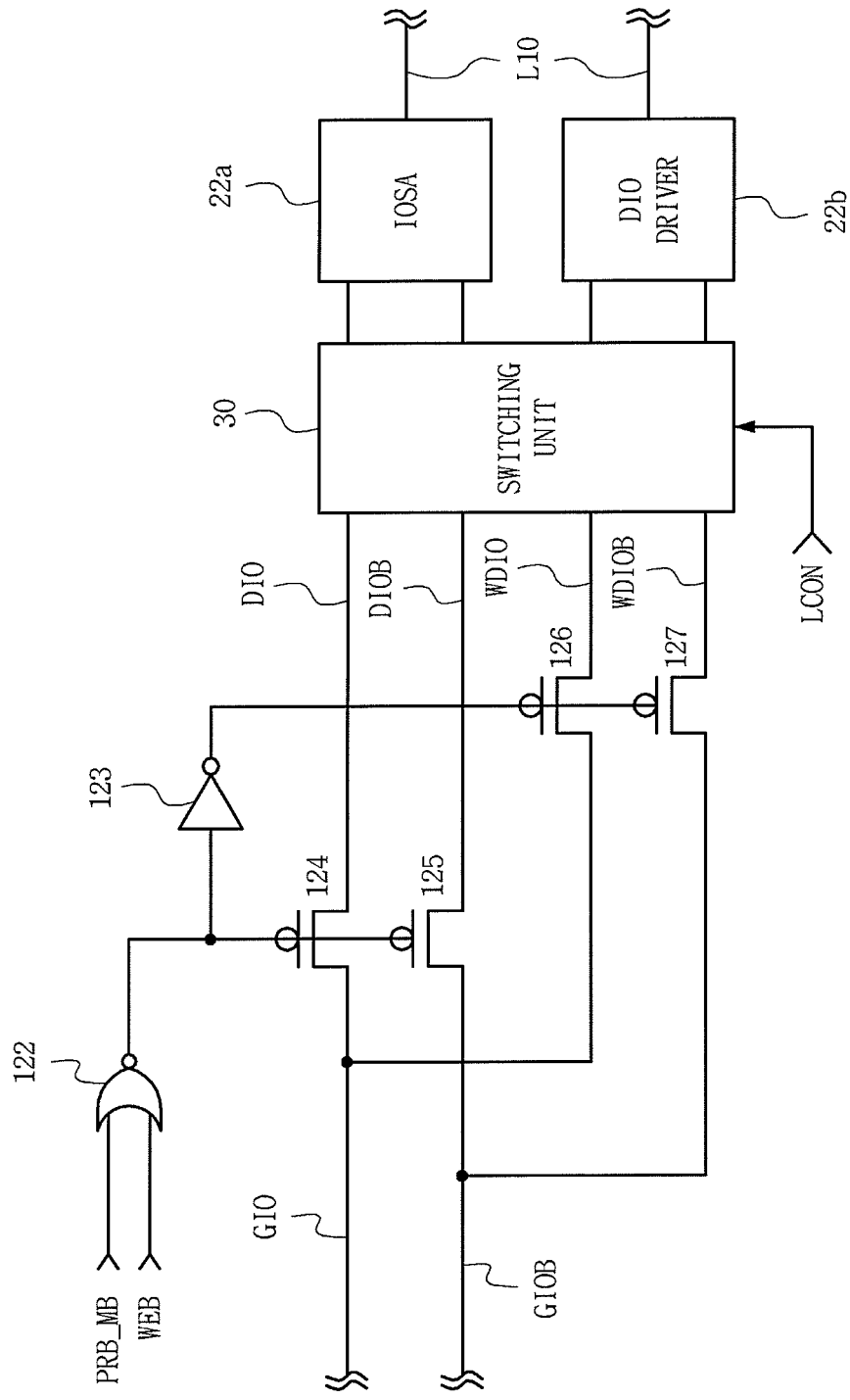
FIG. 13 illustrates in detail a path of data input/output through switching unit shown in FIG. 10.

FIG. 13 illustrates in detail a path of data input/output through switching unit shown in FIG. 10. Referring to FIG. 13, a related input/output operation of the switching unit 30 referred to in FIG. 10 is illustrated in detail. When switching transistors 124 and 125 are turned on, a read data output line pair DIO, DIOB is coupled to the global input/output line pair GIO, GIOB. A turn-on section of the switching transistors 124 and 125 corresponds to a read operation mode. On the other hand, write data input line pair WDIO, WDIOB is coupled to the global input/output line pair GIO, GIOB when switching transistors 126 and 127 are turned on. A turn-on section of the switching transistors 126 and 127 corresponds to a write operation mode, and for that, a NOR gate 122 gating signals PRB_MB and WEB and an inverter 123 are utilized. An input/output sense amplifier 22*a* coupled to switching unit 30 is activated in a read operation mode, and a DIO driver 22*b* is activated in a write operation mode.

Figure 14:
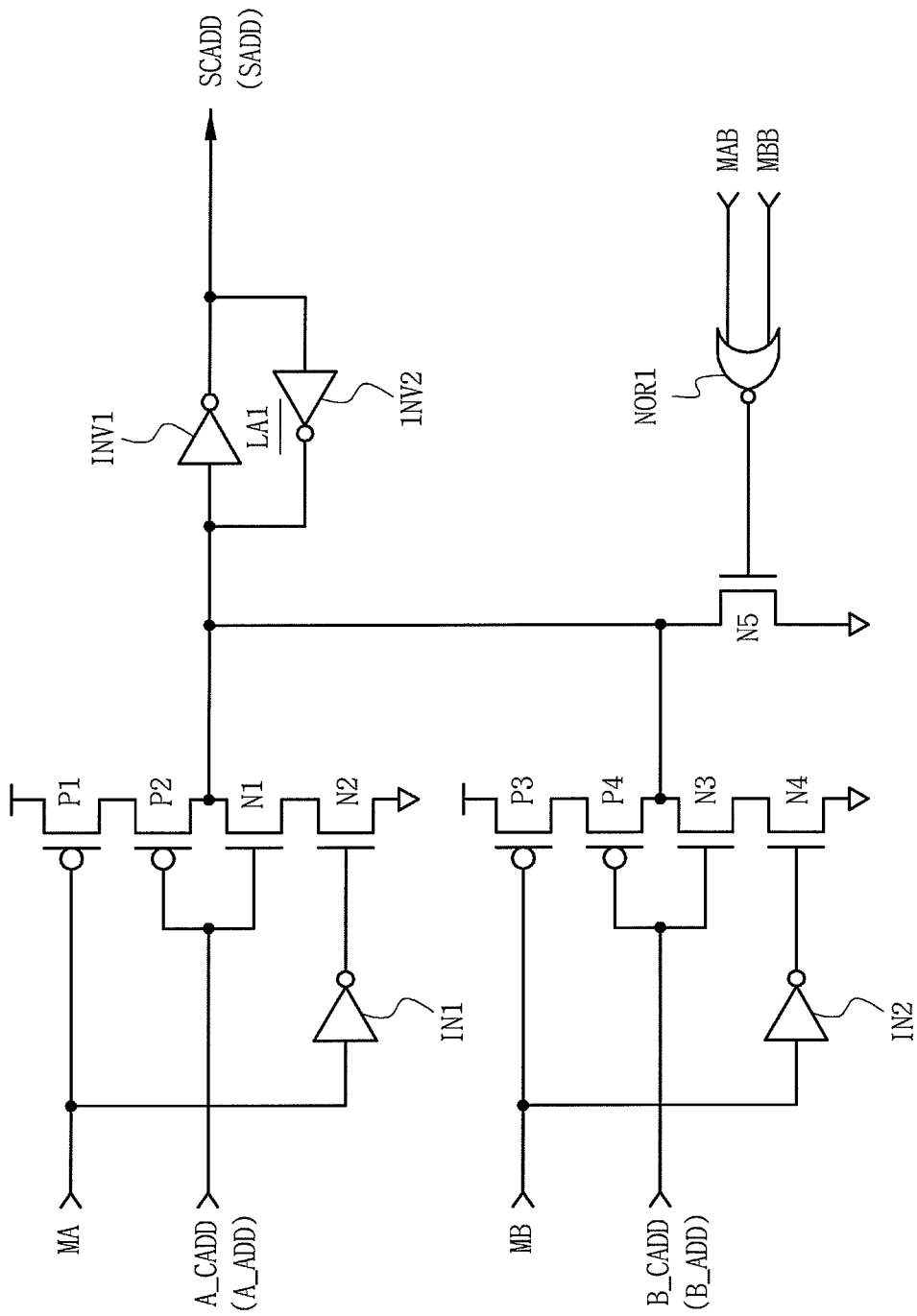
FIG. 14 is a circuit diagram illustrating in detail an address multiplexer shown in FIG. 10.

FIG. 14 is a circuit diagram illustrating in detail an address multiplexer shown in FIG. 10. Examples of an address multiplexer shown in FIG. 14 can be used as the row address multiplexer 71 or the column address multiplexer 70 shown in FIG. 10. In other words, one address multiplexer is realized by using the same circuit devices, and can function as either a row address multiplexer or column address multiplexer according to an input signal.

The column address multiplexer 70 comprises clocked-complementary metal oxide semiconductor (CMOS) inverters constructed of PMOS and NMOS transistors P1-P4 and N1-N4, and an inverter latch LA1 constructed of inverters INV1 and INV2, to receive two respective column addresses A_CADD and B_CADD from two ports through two input terminals thereof, and to select one of two inputs according to a logic state of the path decision signal MA, MB, and to output it as a selection column address SCADD. An NMOS transistor N5 and a NOR gate NOR1 are utilized to provide a discharge path between an input terminal of the inverter latch LA1 and a ground. Inverters IN1 and 1N2 are utilized to invert a logic state of the path decision signal MA, MB.

In FIG. 14, for example, when the path decision signal MA is applied with a logic low level, column address A_CADD applied through first port 60 is inverted through an inverter constructed of PMOS and NMOS transistors P2 and N1 and is again inverted through the inverter INV1 and then is output as the selection column address SCADD. In addition, in this case, the path decision signal MB is applied with a logic high level, thus column address B_CADD, which can be applied through the second port 61, is not provided to an input terminal of the latch LA1 since the inverter constructed of PMOS and NMOS transistors P4 and N3 has an inactive state. As a result, column address B_CADD, which can be applied through the second port 61, is not output as the selection column address SCADD. Further, in FIG. 14, when an output of the NOR gate NOR1 becomes a high level, the NMOS transistor N5 is turned on and a logic level latched to the latch LA1 transitions to a low level.

Figure 15:
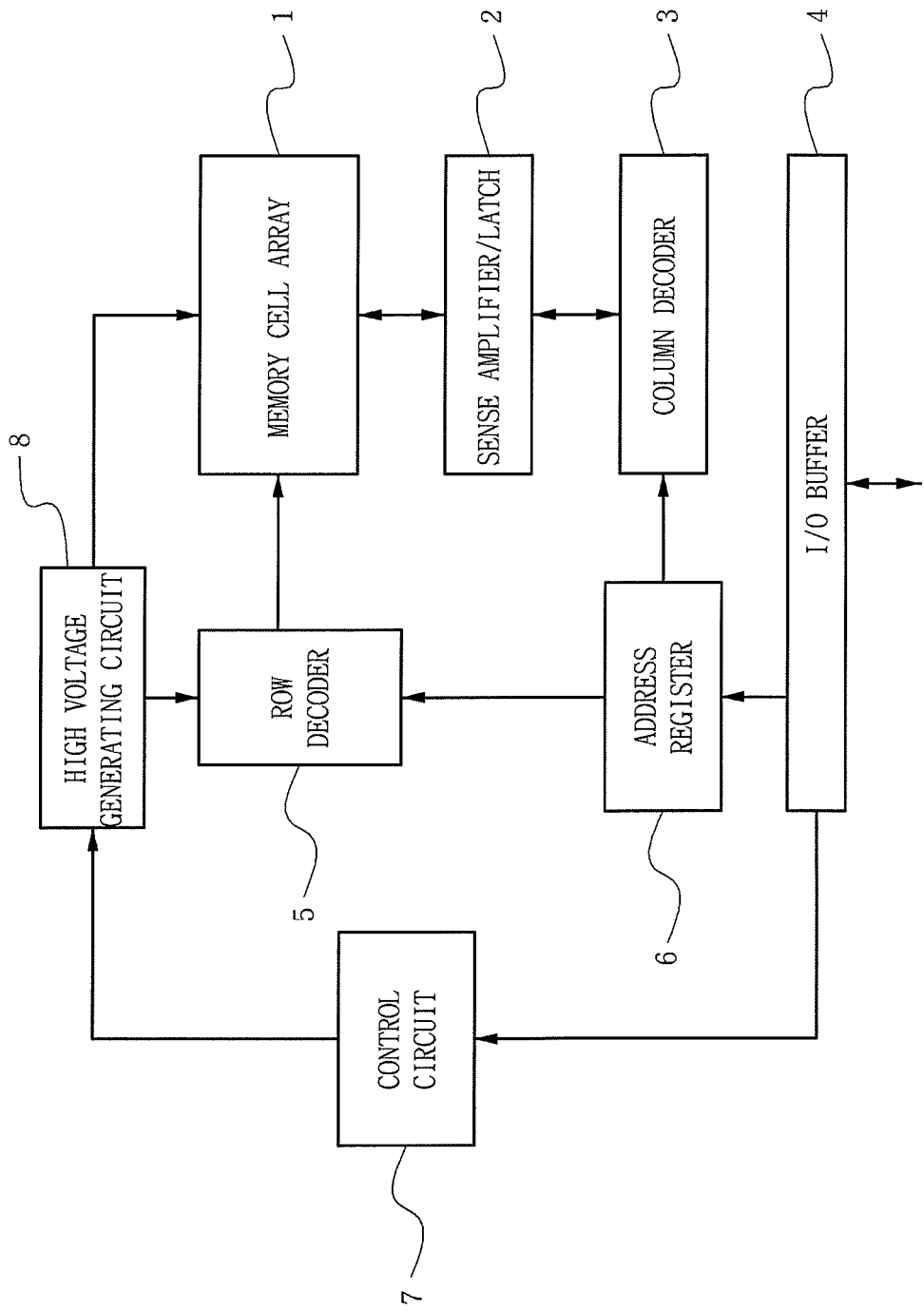
FIG. 15 is a block diagram illustrating in detail a flash memory shown in FIG. 4 or 5.
Figure 16:
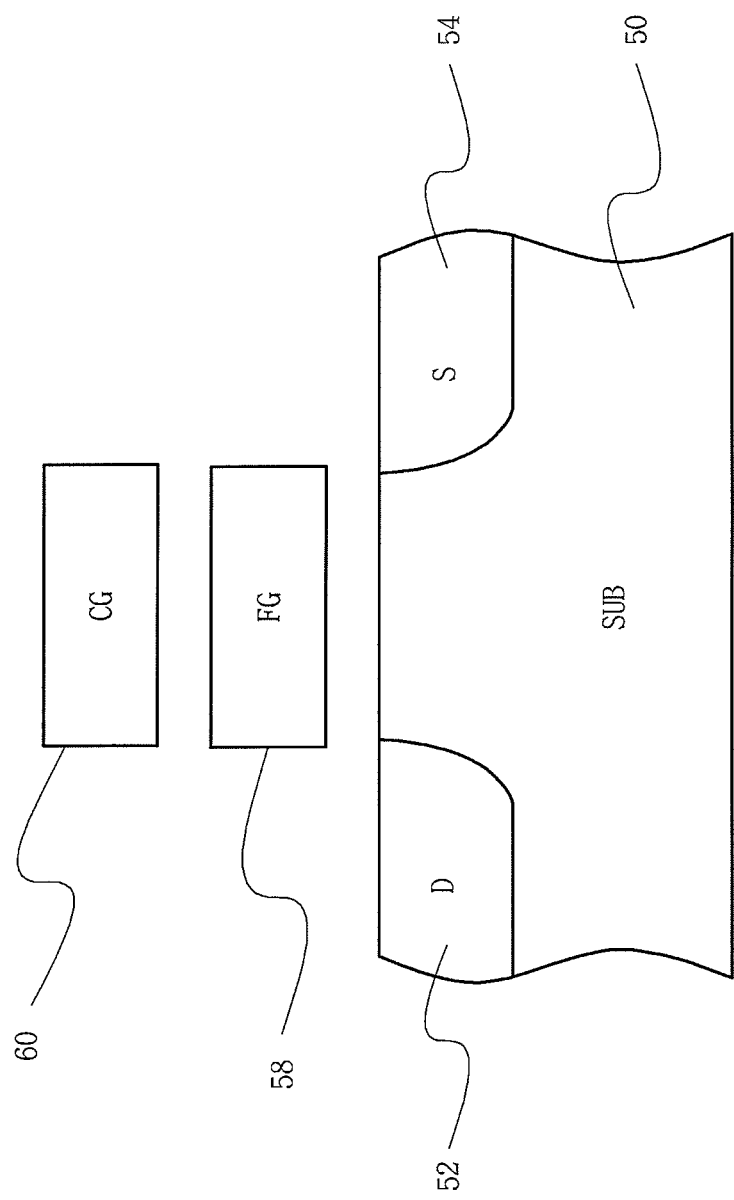
FIG. 16 illustrates the structure of unit memory cell constituting a memory cell array shown in FIG. 15.
Figure 17:
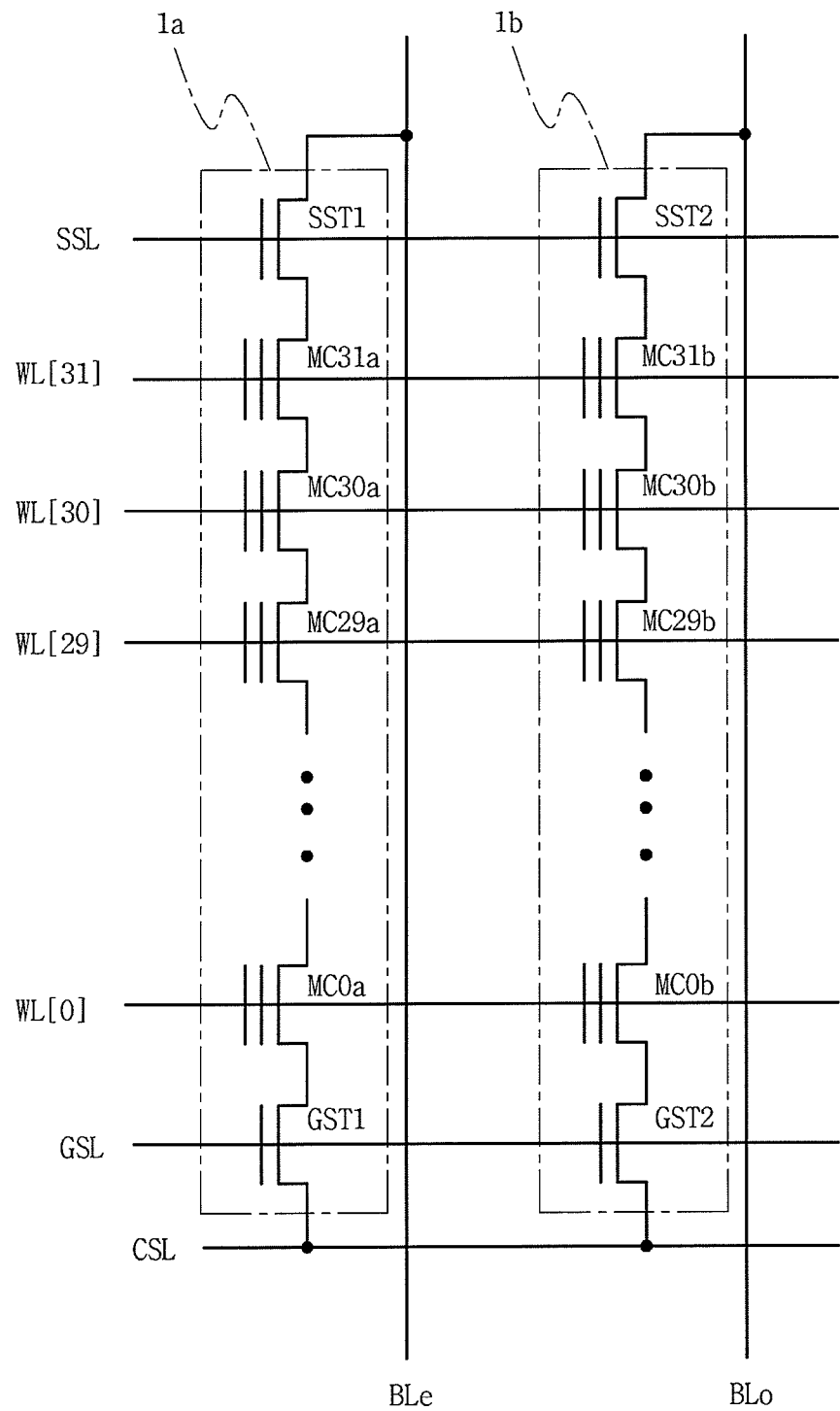
FIG. 17 illustrates a structure of NAND type memory cell array provided in disposing unit memory cells shown in FIG. 16 in a string type.

FIG. 15 is a block diagram illustrating in detail a flash memory shown in FIG. 4 or 5, and FIG. 16 illustrates the structure of unit memory cell constituting a memory cell array shown in FIG. 15. FIG. 17 illustrates a structure of NAND type memory cell array provided for string type unit memory cells of FIG. 16.

FIG. 15 depicts a block connection structure of NAND type flash EEPROM including a memory cell array 1, sense amplifier and latch 2, column decoder 3, input/output buffer 4, row decoder 5, address register 6, high voltage generating circuit 8 and control circuit 7. The sense amplifier and latch 2 may sense and store input/output data of memory cell transistors, and the column decoder 3 may select bit lines, and the row decoder 5 may select word lines. The address register 6 may store addresses, and the high voltage generating circuit 8 may generate high voltage higher than operation power voltage for a store or erase operation. The control circuit 7 controls an operation of the nonvolatile semiconductor memory.

The memory cell array 1 may be configured in a NAND type as shown in FIG. 17. That is, FIG. 17 is an equivalent circuit diagram illustrating a connection structure for memory cells of the memory cell array 1. The memory cell array 1 comprises a plurality of cell strings (NAND cell units), but a first cell string 1*a* coupled to an even bit line BLe and a second cell string 1*b* coupled to an odd bit line BLo are just shown for a reference in the drawings.

The first cell string 1*a* comprises a string selection transistor SST1 whose drain is coupled to a bit line BLe, a ground selection transistor GST1 whose source is coupled to a common source line CSL, and a plurality of memory cell transistors MC31*a*, MC30*a*, . . . , MC0*a* whose drain-source channels are connected in series between a source of the string selection transistor SST1 and a drain of the ground selection transistor GST1. Similarly, the second cell string 1*b* comprises a string selection transistor SST2 whose drain is coupled to a bit line BLo, a ground selection transistor GST2 whose source is coupled to the common source line CSL, and a plurality of memory cell transistors MC31*b*, MC30*b*, . . . , MC0*b* whose drain-source channels are connected in series between a source of the string selection transistor SST2 and a drain of the ground selection transistor GST2.

A signal applied to a string selection line SSL is supplied in common to gates of the string selection transistors SST1 and SST2, and a signal applied to a ground selection line GSL is supplied in common to gates of the ground selection transistors GST1 and GST2. Word lines WL0-WL31 are coupled equivalently in common to control gates of memory cell transistors belonging to the same row. Bit lines BLe and BLo are operationally coupled to the sense amplifier and latch 2 of FIG. 15 and are disposed in parallel with one another on a same layer that is different from the layer of the word lines WL0-WL31.

The optional memory cell transistor shown in FIG. 17 is comprised of MOS transistor having a floating gate 58 below a control gate 60 as shown in FIG. 16.

Operations of a unit memory cell comprised of MOS transistor having a charge-storage floating gate are described in brief as follows, as shown in FIG. 16.

In the operation of a NAND-type EEPROM, erase, write and read operations are described as follows. The erase and program (write) operation can be attained by using a Fowler-Nordheim (F-N) tunneling current. For example, in the erase, a very high potential is applied to a substrate 50 shown in FIG. 16 and a low potential is applied to the CG (Control Gate) 60 of memory cell transistor. In this case, a potential determined by a coupling ratio for a capacitance between CG 60 and FG (Floating Gate) 58 and a capacitance between the FG 58 and the substrate 50 is applied to the FG 58. When a potential difference between a floating gate voltage Vfg applied to the FG 58 and a substrate voltage Vsub applied to the substrate 50 is greater than a potential difference creating an F-N tunneling, electrons gathered in the FG 58 move to the substrate 50 from the FG 58. Such operation lowers a threshold voltage Vt of a memory cell transistor constructed of CG 60, FG 58, a source 54 and a drain 52. Even when the Vt is sufficiently low so that 0 V is applied to the CG 60 and the source 54, current flows when an appropriate positive high voltage is applied to the drain 52. This operation is called "ERASED" and is logically represented as '1'.

In the write (program) operation, 0V is applied to source 54 and drain 52 and a very high voltage is applied to CG 60. At this time, an inversion layer is formed in a channel region and the source and drain both have a potential of 0V. When a potential difference between Vchannel (0 V) and Vfg, determined by a rate of capacitances between CG and FG and between FG and the channel region, becomes great enough to create the F-N tunneling, electrons move from the channel region to the FG 58. In this case, Vt increases, and current does not flow when a predetermined amount of voltage is applied to the CG 60, 0V is applied to the source 54, and an appropriate positive voltage is applied to the drain 52. This operation is called "PROGRAMMED" or "WRITTEN" and is indicated as a logic '0'.

In a memory cell array having a plurality of cell strings such as the first and second cell strings, a unit of page indicates memory cell transistors in which control gates are connected in common to the same word line. Plural pages including a plurality of memory cell transistors are provided as a cell block, and one cell block unit generally includes one or plural cell strings per bit line. A NAND flash memory has a page program mode for a high speed programming or writing. A page program operation is classified as data loading operation and a program operation. The data loading operation is to sequentially latch and store data of a byte magnitude in data registers from input/output terminals. Data registers are utilized corresponding to respective bit lines. The program operation is to write data stored in the data registers to memory transistors on a word line selected through bit lines.

In the NAND-type EEPROM described above, a read operation and a program/write operation are generally performed by a unit of page, and an erase operation is performed by a unit of block. Actually, an electron movement between a channel and an FG of the memory cell transistor is performed only in the program/write and erase operations, while in a read operation, intact data stored in a memory cell transistor is read without damaging the data only after the erase and program/write operations are completed.

In the read operation, a voltage higher than a selection read voltage Vr applied to CG of a selected memory cell transistor is applied to a CG of a non-selected memory cell transistor. Then, whether or not current flows in a corresponding bit line depends on a program state of the selected memory cell transistor. When a threshold voltage of a programmed memory cell is higher than a reference value under a predetermined voltage condition, the memory cell is determined to be an off-cell, thus charging a corresponding bit line to a high voltage level. On the other hand, when a threshold voltage of programmed memory cell is lower than a reference value, the memory cell is determined to be an on-cell, and a corresponding bit line is discharged to a low voltage level. This state of the bit line is finally read out as '0' or '1' through a sense amplifier 2 called the page buffer.

Memory cell transistors of the cell string initially have an erase operation with a threshold voltage of, i.e., about −3V or below. When programming a memory cell transistor, a high voltage is applied to a word line of a selected memory cell for a given duration and the selected memory cell changes to a higher threshold voltage, while threshold voltages of non-selected memory cells remain unchanged.

Operation is described as follows, as an example without deviating from the inventive spirit.

Referring back to FIG. 4, according to an embodiment of the invention, when a power-on operation for a multiprocessor system is performed, a booting operation of the second processor 200 is performed. In this case, the second processor 200 accesses a boot code area of the flash memory 300 through a bus line B3. Then, boot code data stored in a nonvolatile portion of the boot code area is loaded into the second processor 200, thus completing the booting operation of the second processor 200, corresponding to step S60 of FIG. 12. The second processor 200 having completed its booting operation accesses a boot code area of the flash memory 300 storing boot code of the first processor 100. Boot code data of the first processor 100 is stored at a shared memory area of the ONEDRAM® 400 by the second processor 200. Thus, an access authority for the shared memory area 11 of the ONEDRAM® 400 is transferred to the first processor 100 and the first processor 100 receives boot code data and starts its boot operation. In other embodiments of the invention, the first processor 100 may access the flash memory 300 through another interface or a direct path and perform its booting operation.

After the first processor 100 completes the booting operation, the first processor 100 accesses the shared memory area 11 and the first mailbox 52 to store communication code data updated during operation at the flash memory 300. Communication code data from the first processor 100 is written to the shared memory area 11 and is then transmitted from the shared memory area to the flash memory 300 through the second processor 200. On the other hand, a message transmitted to the second processor 200, e.g., authority request, address, data size, transmission data indicating an address of shared memory with stored-data, or commands, etc., is written to the first mailbox 52. Therefore, at this time, a control authority flag of the semaphore area 51 shown in FIG. 9 is changed and thus the second processor has the control authority to the shared memory share 11. The second processor 200 accesses the first mailbox 52, receives message transmitted from the first processor 100, and accesses the shared memory area 11 and reads communication code data of the first processor 100. Such operation corresponds to step S61 of checking a data receipt of FIG. 12.

The second processor 200 applies the communication code data to the flash memory 300 through system bus B3. The operations of receiving data from the shared memory area 11 and of applying data to the flash memory 300 may be processed through a multi-tasking operation of the second processor 200. Such operation corresponds to step S62 of FIG. 12. Accordingly, the flash memory 300 performs a page program operation of writing the communication code data in a unit of page according to a designated write address. The write operation in the flash memory 300 indicates a program operation. The program operation indicates an operation of implanting electrons into a floating gate 58 of FIG. 16 as described above with reference to FIGS. 15 to 17.

In the page program operation mode of a multiprocessor system such as in FIG. 4, and referring again to FIG. 12, the second processor 200 at steps S63 and S64 generates storage-state information indicating whether or not a writing into the flash memory 300 has been completed, through the interrupt generator 250, and at step S65 directly transmits the information to the first processor 100 through the interrupt signal line INT without passing through the ONEDRAM® 400. Accordingly, the first processor 100 can quickly check the storage-state information and perform a subsequent operation.

On the other hand, when the system of an embodiment such as that shown in FIG. 5 is configured, again referring to FIG. 12, when the second processor 200 receives at step S63 a state-check command through a polling line POLLING after the step S62 of FIG. 12, stage-state information is generated at step S64 through a serial interface unit 260. The storage-state information is directly transmitted at step S65 to the first processor 100 through the polling signal line POLLING without passing through the ONEDRAM® 400. Accordingly, the first processor 100 can promptly check the storage-state information.

Alternatively, according to other embodiments of the invention, storage-state information in the flash memory device may be first written to an internal register of the multiport semiconductor memory device 400, such that the information is directly applied to the first processor.

As described above, in a multiprocessor system according to an embodiment of the invention, a processor indirectly coupled to a nonvolatile memory can directly check a program operation completion state for write data, thereby enhancing a data storage performance of the system.

In a multiprocessor system according to an embodiment of the invention, the number of processors may be more than two. The processor may be a microprocessor, CPU, digital signal processor, micro controller, reduced-command set computer, complex command set computer, or the like. It is noted herein that inventive scope is not limited to the number of processors in the system. Further, the inventive scope is not limited to any special combination of processors in adapting the same or different processors as the embodiments described above.

It will be apparent to those skilled in the art that modifications and variations can be made in the present invention without deviating from the inventive spirit or scope. Thus, it is intended that exemplary embodiments of the present invention cover any such modifications and variations provided they come within the scope of the appended claims and their equivalents.

For example, the configuration for a shared memory bank of multiport semiconductor memory or the configuration of mailbox and semaphore, or circuit configuration and access method may be changed.

In addition, a control of the data path between the shared memory area and the port units can be realized through various methods. The configuration of the mailbox and semaphore using a register has been described above, but without limiting to that, an inventive technical spirit may be extended to other nonvolatile memories such as PRAM etc.

Accordingly, these and other changes and modifications are seen to be within the true inventive spirit and scope as defined by the appended claims.

What is claimed is:

1. A multiprocessor system comprising:
a first processor;
a multiport semiconductor memory device coupled to the first processor;
a nonvolatile semiconductor memory device; and
a second processor coupled with the multiport semiconductor memory device and the nonvolatile semiconductor memory device in a multilink architecture, adapted to storing, in the nonvolatile semiconductor memory device, data written in a shared memory area of the multiport semiconductor memory device by the first processor; and
in response to a request of the first processor, the second processor checks whether the storing of the data has been completed and directly transmits results of the check as storage-state information on whether the storing of the data in the nonvolatile semiconductor memory device has been completed without passing it through the multiport semiconductor memory device.

2. The system of claim 1, wherein the transmission of the storage-state information is performed through an interrupt scheme.

3. The system of claim 1, wherein the transmission of the storage-state information is performed through a polling scheme using a serial interface.

4. The system of claim 1, wherein the storage-state information is state information for whether or not the data initially written to the shared memory area of the multiport semiconductor memory device by the first processor has been stored in the nonvolatile semiconductor memory device through the second processor.

5. The system of claim 1, wherein the multiport semiconductor memory device comprises:
port units individually coupled corresponding to the first and second processors;
a shared memory area accessed in common by the first and second processors through the port units and assigned in a unit of predetermined memory capacity of a memory cell array; and
a data path control unit controlling a data path between the shared memory area and the port units, to perform a data transmission/reception between the first and second processors through the shared memory area.

6. The system of claim 5, wherein the memory cell array further comprises memory areas dedicatedly accessed by the respective first and second processors.

7. The system of claim 5, wherein the data path control unit comprises an internal register positioned outside the memory cell array and accessed by all the processors.

8. The system of claim 7, wherein the internal register is comprised of a latch type register accessed in place of a specific area of the shared memory area when a specific address to access the specific area of the shared memory area is applied, the latch type register storing data used for controlling the data path.

9. The system of claim 7, wherein the internal register comprises a semaphore area storing a control authority for the shared memory area, and mailbox areas individually assigned corresponding to the number of processors to store a message for each processor corresponding to a data transmission direction.

10. The system of claim 1, wherein the nonvolatile semiconductor memory device is a NAND or NOR type flash memory.

11. A multiprocessor system comprising:
- a first processor performing a task related to communication modulation/demodulation;
- a multiport semiconductor memory device coupled to the first processor through a first port unit, the multiport semiconductor memory device including a shared memory area assigned in a unit of predetermined memory capacity of a memory cell array and an internal register positioned outside the memory cell array and coupled to an interrupt pin of the first processor;
- a nonvolatile semiconductor memory device having a page program operation; and
- a second processor coupled with the multiport semiconductor memory device and the nonvolatile semiconductor memory device in a multilink architecture, and adapted to store, in the nonvolatile memory device, data written in a shared memory area of the multiport memory device by the first processor; and
- in response to a request of the first processor, the second processor checks whether the storing of the data has been completed and writes results of the check as storage-state information on whether the storing of the data in the nonvolatile semiconductor memory device has been completed without passing it through the multiport semiconductor memory device.

* * * * *